United States Patent

Hayosh et al.

(10) Patent No.: US 6,785,643 B2
(45) Date of Patent: Aug. 31, 2004

(54) CHART PARSING USING COMPACTED GRAMMAR REPRESENTATIONS

(75) Inventors: Thomas E. Hayosh, Lake Zurich, IL (US); Harry Martin Bliss, Evanston, IL (US); William Thompson, Evanston, IL (US); Guido A. Minnen, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 186 days.

(21) Appl. No.: 09/977,624

(22) Filed: Oct. 15, 2001

(65) Prior Publication Data

US 2003/0074184 A1 Apr. 17, 2003

(51) Int. Cl.$^7$ .......................... G06F 17/27; G10L 15/00
(52) U.S. Cl. ........................................ 704/9; 704/257
(58) Field of Search ............................ 704/9, 10, 257, 704/256, 259

(56) References Cited

U.S. PATENT DOCUMENTS

| | | | | |
|---|---|---|---|---|
| 5,625,554 A | * | 4/1997 | Cutting et al. ................. | 704/9 |
| 5,642,519 A | * | 6/1997 | Martin .......................... | 704/9 |
| 5,960,384 A | * | 9/1999 | Brash ............................ | 704/9 |
| 5,963,742 A | * | 10/1999 | Williams ....................... | 704/9 |
| 6,128,596 A | * | 10/2000 | Mackie ........................ | 704/257 |

OTHER PUBLICATIONS

Marsal Gavalda; "Soup: A Parser for Real–World Spontaneous Speech"; Interactive Systems, Inc.; Pittsburgh, PA.

Jay Earley; "An Efficient Context–Free Parsing Algorithm"; University of Californai, Berkeley, CA.; pp. 25–33.

"Direct Parsing of ID/LP Grammars" by Stuart M. Shieber. *Liguistics and Philosophy7*; D. Reidel Publishing Company, 1984, pp. 135–154.

* cited by examiner

*Primary Examiner*—Patrick N. Edouard (57) ABSTRACT

A chart parser and a method for generating a parse chart for a sequence of input symbols in accordance with an abbreviated representation of a grammar. According to the method, an abbreviated representation of a grammar is stored as a set of finite-state automata, each finite-state automaton corresponding to a rule of the grammar. Chart edges are derived chart edges from the sequence of input symbols in accordance with the set of finite-state automata and are stored in the parse chart. Each chart edge spans a portion of the sequence of input symbols and may include a left input vertex index corresponding to the start of the span of the chart edge, a right input vertex index corresponding to the end of the span of the chart edge, a rule number, indicating which finite-state automaton of the plurality of finite-state automata has been used to generate the chart edge, a left state index, indicating the left most state of the finite-state automaton that has been matched and a right state index, indicating the right most state of the finite-state automaton that has been matched, the left-hand side of the rule and a path through the finite state comprising the right-hand side of the rule or so-called backpointers to the edges used to derive the current edge. The chart parser includes a chart controller and an agenda controller, together with associated memory.

15 Claims, 4 Drawing Sheets

CHART PARSING USING COMPACTED GRAMMAR REPRESENTATIONS

TECHNICAL FIELD

This invention relates to techniques and apparatus for carrying out chart parsing making direct use of compactly encoded grammars. The invention has application to automatic speech recognition with natural language input.

BACKGROUND OF THE INVENTION

Natural language interfaces play an increasingly important role in the use of small handheld devices, such as cell phones and personal digital assistants (PDAs). Natural language interfaces are also becoming important in a range of other applications, including automotive accessory control and home-appliance control. In all of the applications, there are benefits in having the natural language interface be as efficient as possible so as to minimize cost, size and power consumption.

Natural language processing systems that make use of context free grammars must load these grammars from a textual format into internal memory. The grammars may be written in a compact format, such as the Backus-Naur Form (BNF) described in "The Syntax And Semantics Of The Proposed International Algebraic Language Of The Zuerich Acm-Gamm Conference", by J. Backus, published in *Information Processing: Proceedings of the International Conference on Information Processing, Paris,* pp 125–132, UNESCO, 1959. If such a compact form is used, the rules of the grammar must typically first be expanded in order for a chart parser to make use of them. Many algorithms exist for parsing natural language using context free grammars. These algorithms use numerous techniques to improve performance, the most important being the use of a chart to avoid re-computation of previous results and the incorporation of filtering techniques to avoid computation of irrelevant results.

Until recently, relatively little attention has been given to direct parsing with context free grammars written in a compact form, such as BNF. Mostly for theoretical reasons, some approaches deal with particular types of compacted grammar notations. For example, "An efficient context-free parsing algorithm", J. Earley, Communications of the ACM, 6(8), 451–455, 1970, shows how a chart parser can be extended to deal with express repetition. "Direct Parsing of ID/LP Grammars", S. Shieber, Linguistics and Philosophy, 7:135–154, 1984, discusses the extension of a chart parser for direct processing of Immediate Dominance/Linear Precedence. The abbreviated notation in ID/LP grammars is designed especially for abbreviating grammars of natural languages that exhibit relatively free word order. However, none of these approaches take advantage of the compact BNF representation for context-free grammars that is often used by the author of a grammar during development.

A related chart parsing algorithm is proposed in "SOUP: A Parser For Real-World Spontaneous Speech", M. Gavalda, International Workshop on Parsing Technologies, 2000. This algorithm processes expressions in a top-down fashion, using recursive transition networks automatically derived from a grammar in the Java Speech Grammar format. A top-down parsing approach is conjectured to be less efficient than a bottom-up approach as it comes to processing fragmentary input resulting from speech recognition errors and/or ungrammatical utterances.

Existing parsers are unable to make direct use of a grammar represented in an abbreviated or compact form, such as the Backus-Naur form. Consequently, significant memory and processing resources are required to expand and store the rules of an abbreviated grammar. There is an unmet need for a parser that can make direct use of a grammar represented in an abbreviated or compact form.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The present invention relates to a bottom-up parsing technique that directly processes natural language expressions using grammars that consist of rules specifying the possible alternative expansions of a non-terminal symbol in the form of a regular expression, i.e. the Backus-Naur form (BNF) grammars. The present invention is applicable to all context-free grammar formalisms that use abbreviatory notation to express optionality, disjunction and repetition. Here, a terminal symbol is taken to be any symbol that can occur in the natural language expression itself. For example, in spoken language, the terminal symbols may be actual words and numbers. Non-terminal symbols are generic terms for sequences of one or more terminal symbols or other non-terminal symbols. For example, <noun>, <verb> and <sentence> are non-terminal symbols. The parse tree analysis of an expression is determined by finding instances of the relevant regular expressions through matching them against the words in the expressions and the intermediate parsing results in the chart. The intermediate results in the chart directly refer to the compacted grammar rules in the BNF grammar. This in turn necessitates an adaptation of the standard chart-parsing operations for creating intermediate results.

Context-free grammars (CFGs) are a device for modeling natural languages; see for example, "Three Models For The Description Of Language", N, Chomsky, IRI Transactions on Information Theory, 2(3), 113–124, 1956. CFGs consist of a set of nonterminal and terminal symbols in conjunction with a set of rewrite rules for rewriting expression using these symbols. Each rewrite rule consists of a left-hand side and a right-hand-side, where the left-hand side consists of a single non-terminal and the right-hand side consists of a sequence of terminal and non-terminal symbols. An example of a CFG with 28 rewrite rules is listed below.

<address>→<number><street><city><state><zip_code>

<address>→<number><street>Apt<number><city><state><zip_code>

<address>→<number><street><city><state><zip_code><country>

<address>→<number><street>Apt<number><city><state><zip_code><country>

<number>→<digit>

<number>→<digit><number>

<street>→Main Street

<street>→Broadway Road

<street>→Lincoln Avenue

<city>→Chicago

<city>→New York

<city>→Los Angeles

<zip_code>→<number><number><number><number><number>

<country>→USA

<country>→Canada

<digit>→0

<digit>→1

<digit>→2

<digit>→3

<digit>→4

<digit>→5

<digit>→6

<digit>→7

<digit>→8

<digit>→9

This example grammar is simplified for reasons of exposition—for example, by ignoring the meaning of natural language expressions. Practical grammars for generating street addresses would be larger and more complex. The rules can be used to generate expressions or productions, which in this example are street addresses. In general, a production is any sequence of terminal symbols (expression, utterance, etc.) that can be produced according to the rules of the grammar. Some examples of expressions generated by the grammar are:

1 6 Lincoln Avenue Apt 3 7 Chicago Ill. 6 0 2 0 1 USA 3 0 5 Broadway Avenue New York 5 8 9 4 3

5 6 Main Street Apt 5 Los Angeles Calif. 2 6 7 8 9

1 0 5 6 7 Lincoln Avenue Chicago New York 1 2 3 4 5 Canada

Context-free grammars, such as this one, are used in conjunction with parsing algorithms in order to assign structure to strings of linguistic input. One of the most commonly used parsing algorithm is a dynamic processing approach termed "chart parsing", in which intermediate results are stored in a table (or a "chart") for use in creating further parsing results. This is described in the book "Natural Language Understanding", J. Allen, Benjamin/Cummings Publishing. Storing intermediate results in a chart eliminates the need to re-compute these same results at later stages in the operation of the parser.

Chart parsing is known as an efficient technique for parsing with context-free grammars, but the amount of time required to parse a particular input is a function of the length of the input and the size and structure of the grammar. While input size cannot be controlled a priori, the size and structure of the grammar can be controlled to some extent by the grammar developer. One way to minimize the grammar size is to use Backus-Naur expressions in the present invention for representing the rules. BNF expressions consist of a single non-terminal on the left-hand side and a regular expression containing both terminal and non-terminal symbols on the right-hand side. A BNF grammar for the rewrite rules listed above is:

1. <address>::=(<number><street>[(Apt<number>)]<city><state><zip_code>[<country>]).
2. <number>::=(<digit><digit>*)
3. <street>::=(Main Street | Broadway Road | Lincoln Avenue).
4. <city>::=(Chicago | New York | Los Angeles).
5. <state>::=(Illinois | New York | California)
6. <zip_code>::=(<digit><digit><digit><digit><digit>).
7. <country>::=(USA | Canada).
8. <digit>::=(0 | 1 | 2 | 3 | 4 | 5 | 6 | 7 | 8 | 9).

Note that the 28 rules have been compressed down to only eight BNF expressions, taking advantage of the operators shown in the table below

TABLE 1

| Abbreviatory Notation for Context-Free Grammar Rules. |
| --- |
| ( ) Parentheses surround a sequence of elements. |
| [ ] Square brackets surround an element that is optional. |
| * Kleene star follows an element that may occur zero or more times. |
| \| Vertical bar separates elements that are alternatives to each other. |

In larger grammars, a single BNF expression might correspond to hundreds of context-free rules.

Current bottom-up chart parsing algorithms cannot make direct use of grammars that are compactly specified using BNF notation, and are forced to expand BNF expressions into context-free rewrite rules. The bottom-up parsing technique of the present invention avoids this time-consuming expansion. The parse tree analysis of an expression is determined by finding instances of the relevant regular expressions through matching them against the words in the expressions and the intermediate parsing results in the chart.

Compared to prior bottom-up chart parsing using context-free grammars, direct parsing using BNF grammars includes three types of changes:

1. changes related to the internal representation of the grammar,
2. changes related to the internal representation of the intermediate results, and
3. changes related to how the intermediate results are created.

Each of these types of changes will now be described in turn.

Internal Representation of the Grammar.

BNF expressions consist of a single non-terminal node on the left-hand side and a regular expression containing both terminal and non-terminal symbols on the right-hand side. A BNF grammar rule is represented as <LHS, RHS>, where LHS specifies the category of the nonterminal node on the left-hand side of the rule and RHS specifies the right-hand side of the rule.

Figures 1A, 1B, 1C:
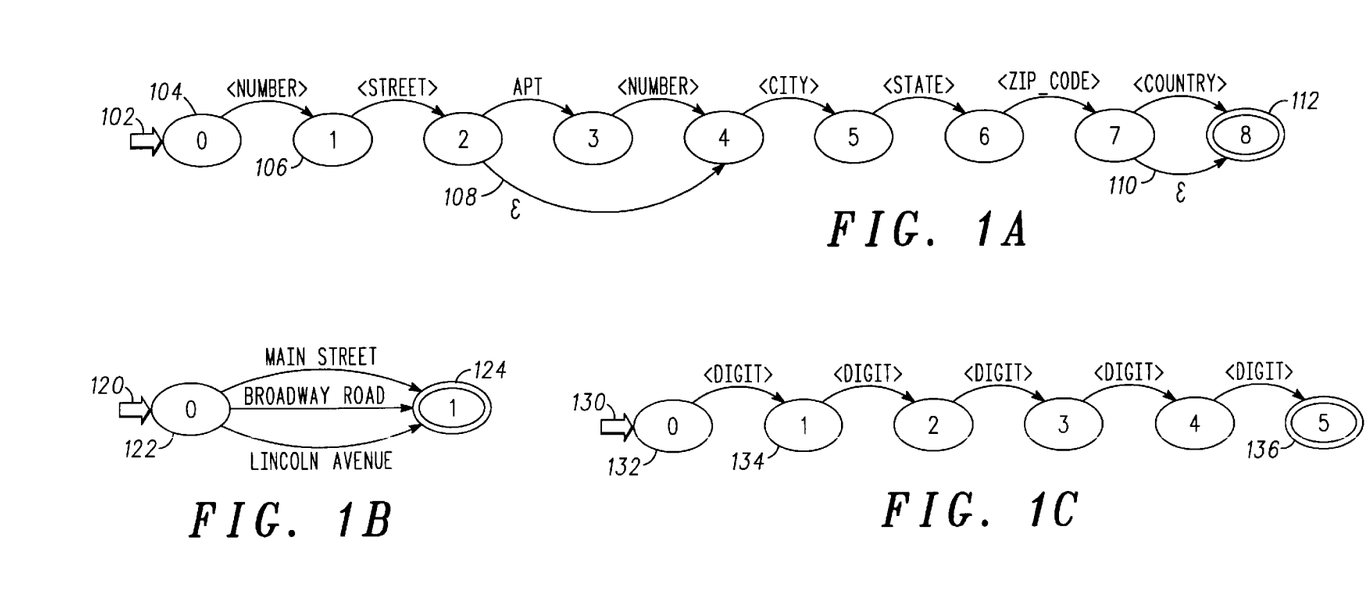
FIG. 1 is a diagrammatic representation of the internal representation of exemplary abbreviated grammar rules in accordance with the present invention.

Rather than expanding the abbreviated rules of a grammar, the parser compiles the right-hand sides of the rules into finite state automata with each transition labeled by an identifier referring to a semantic construction rule and a category label. Examples of finite-state automata for the abbreviated rules are shown in FIGS. 1A, 1B, and 1C. Rule 1 of the grammar on page seven is shown in FIG. 1A. Referring to FIG. 1A, the starting state is indicated by the block arrow 102. The numbered ellipses 104, 106, etc., denote the states 0, 1, . . . , 9 of the right-hand side of the rule for an <address>. The arrows linking the ellipses denote the transitions between states. For example, if a <number> is identified, the automaton transitions from state 0 to state 1. If a <street> is then identified, the automaton transitions from state 1 to state 2. The transitions 108 and 110 are labeled with the character "$\epsilon$" denoting a "null" symbol. This is used to indicate that either an Apartment number or a <city> can follow a <street>. The final state 112 is indicated by a double ellipse.

Rule 3 of the grammar is shown in FIG. 1B. Referring to FIG. 1B, the starting state is indicated by the block arrow 120. The numbered ellipses 122 and 124 denote the states 0 and 1 of the right-hand side of the rule for a <street>. The arrows linking the ellipses denote the transitions between states. Three alternative transitions can be used to transition to the final state 124, which is indicated by a double ellipse.

Rule 6 of the grammar is shown in FIG. 1C. Referring to FIG. 1C, the starting state is indicated by the block arrow 130. The numbered ellipses 132, 134 etc., denote the states 0,etc., of the right-hand side of the rule for a <zip_code>. The arrows linking the ellipses denote the transitions between states. The final state 136 is indicated by a double ellipse.

Changes to the Internal Representation of the Intermediate Results.

Figure 2:
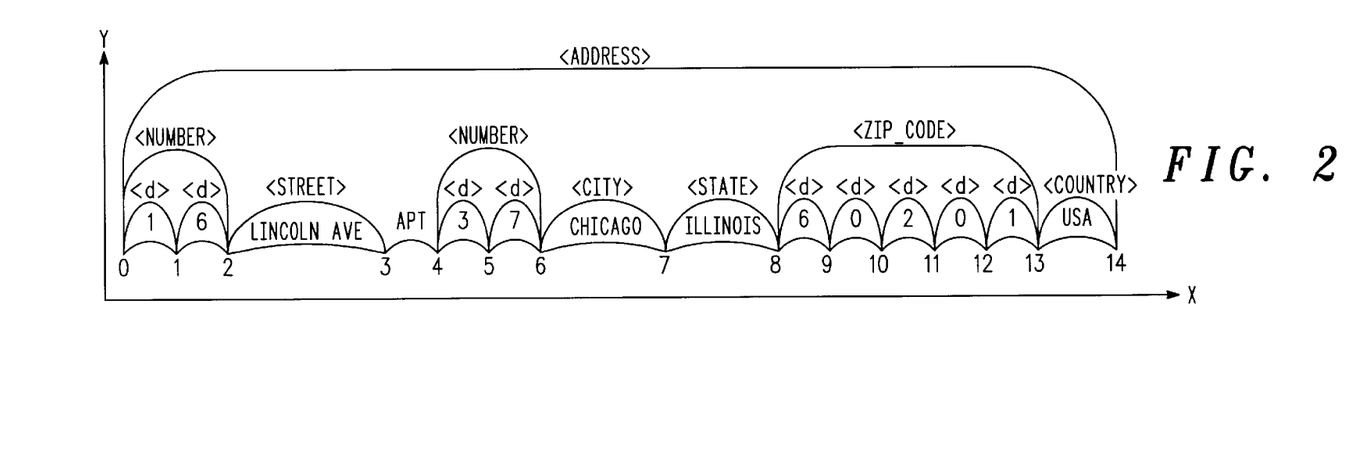
FIG. 2 is an exemplary parse chart in accordance with the present invention.

FIG. 2 is a diagrammatic representation of a parse chart. The input utterance "1 6 Lincoln Avenue Apt 3 7 Chicago Ill. 6 0 2 0 1 USA" is depicted as a sequence of states indicated by the vertices numbered 0, 1, 2, . . . 14 at the bottom of the figure. In the figure, time for the input sequence is increasing from left to right in the direction labeled "X". The vertices denote the breaks in the input sequence. For example, in the bottom sequence in FIG. 2, "Chicago" lies between vertex 6 and vertex 7. All of the symbols in the lowest sequence of transitions are terminal symbols. Using the rules of the grammar, the terminal symbols are used to derive nonterminal symbols, to yield the next lowest sequence of transitions in FIG. 2. For example, rule 8 is used to derive a <digit> as covering the "1" between vertices 0 and 1. Rule 3 is used to derive that "Lincoln Avenue" between vertices 2 and 3 is a constituent labeled <street>>. Processing according to the rules of the grammar may proceed in the X-direction for each Y level, or may proceed as far as possible in the Y-direction before moving in the X-direction. These processes are referred to a "breadth-first" or depth-first processing (also known as "height-first" processing), respectively. In general, any processing scheme may be used provided the entire chart is covered. Eventually, the input utterance is correctly identified at the highest level as an address. Since processing always begins at the bottom of the chart and ends at the top of the chart the process is known as bottom-up chart parsing.

The chart is built up step-by-step by the parser. Intermediate results, representing portions of the chart, are stored as chart entries. The chart entries are often referred to as "edges". According to one embodiment of the present invention, the edges are written in the following form:

[LHS, StartVtx,EndVtx,RuleNumber,LeftRemainder,RightRemainder,Pat h], where LHS specifies the category of the nonterminal node on the left-hand side of the rule with respect to which the intermediate result was obtained. StartVtx and EndVtx specify which portion of the input expression this edge spans. RuleNumber refers to the grammar rule with respect to which the intermediate result was obtained. In order to minimize the edge/chart size, the rule is preferably not copied. LeftRemainder and RightRemainder specify which part of finite state automaton representing the right-hand side of the grammar rule has been recognized, i.e., they refer to the states that constitute the fringes of the path through the automaton that has been recognized so far. Finally, in order to be able to construct the parse tree representing the analysis of the input expression found, Path specifies the sequence of nonterminal/terminal categories recognized so far. The Path entry stores the path through the right-hand side of a rule that the parser has found. In order to efficiently implement the parser it is necessary to keep track of the path. In a further embodiment, back-pointers are saved indicating which edges the current edge was derived from. The path is then reconstructed through these back-pointers. When an edge is derived from another edge a pointer is kept back to the original edge in order to be able to determine the parse tree once a complete edge has been found. For example, an address may contain two numbers and it is necessary to know how these numbers correspond to the input sequence. This can be determined by backtracking through the path, provided that a record has been kept.

For example, consider the edge or chart entry:

[<address>,0,3,1,0,2,<<number>,<street>>]

This edge represents an intermediate result obtained while parsing "1 6 Lincoln Avenue Apt 3 7 Chicago Ill. 6 0 2 0 1 USA". The parser has partially recognized a nonterminal <address> given the input between positions 0 and 3 according to grammar rule 1 in the BNF grammar listed above. In addition, this edge indicates that the right-hand side of rule 1 has been recognized between positions 0 and 2, which corresponds to <<number>,<street>>.

As a result of the fact that edges in the chart use the compacted grammar representation, the number of edges in the chart can often be reduced. With respect to prior chart parsing, all edges that have a left-hand side node with the same nonterminal category and the same part of their right-hand side recognized are collapsed into one edge. If a grammar contains no abbreviatory notation, the number of edges in the chart cannot be reduced. However, the number of edges in the chart will never be increased by the technique of the present invention.

Changes to the Creation of Intermediate Results.

In prior context-free chart parsing, there are two operations for creating intermediate results. The first operation, referred to as "prediction", matches intermediate results in the chart against a sequence of symbols on the right hand side of a rewrite rule. The second operation, referred to as an "extension", combines two intermediate results that together match a sequence of symbols on the right-hand side of a rewrite rule. When all of the symbols on the right-hand side have been matched, a "completed" or passive edge is added to the chart, which contains the nonterminal symbol on the left-hand side of the matched re-write rule.

Direct parsing using BNF type grammars in accordance with the present invention involves these two operations. However, they are modified to work with the different format of BNF grammar rules. Rather than matching a single sequence of symbols, prediction involves matching intermediate results with patterns expressed by the regular expressions on the right-hand sides of the BNF rules. When a particular pattern has been matched, one or more new edges are added to the chart, which contain both the sequences of symbols matched and a specification of precisely how the sequence of symbols has been matched. Likewise, extension involves combining two edges by matching their symbols against a pattern expressed by the regular expression on the right-hand side of a BNF rule. A major difference between the operations of the present invention and prior operations is that operations of the present invention are not deterministic. This is because, in general, there is more than one way to match a given sequence of symbols to a pattern represented by a regular expression.

Figure 3:
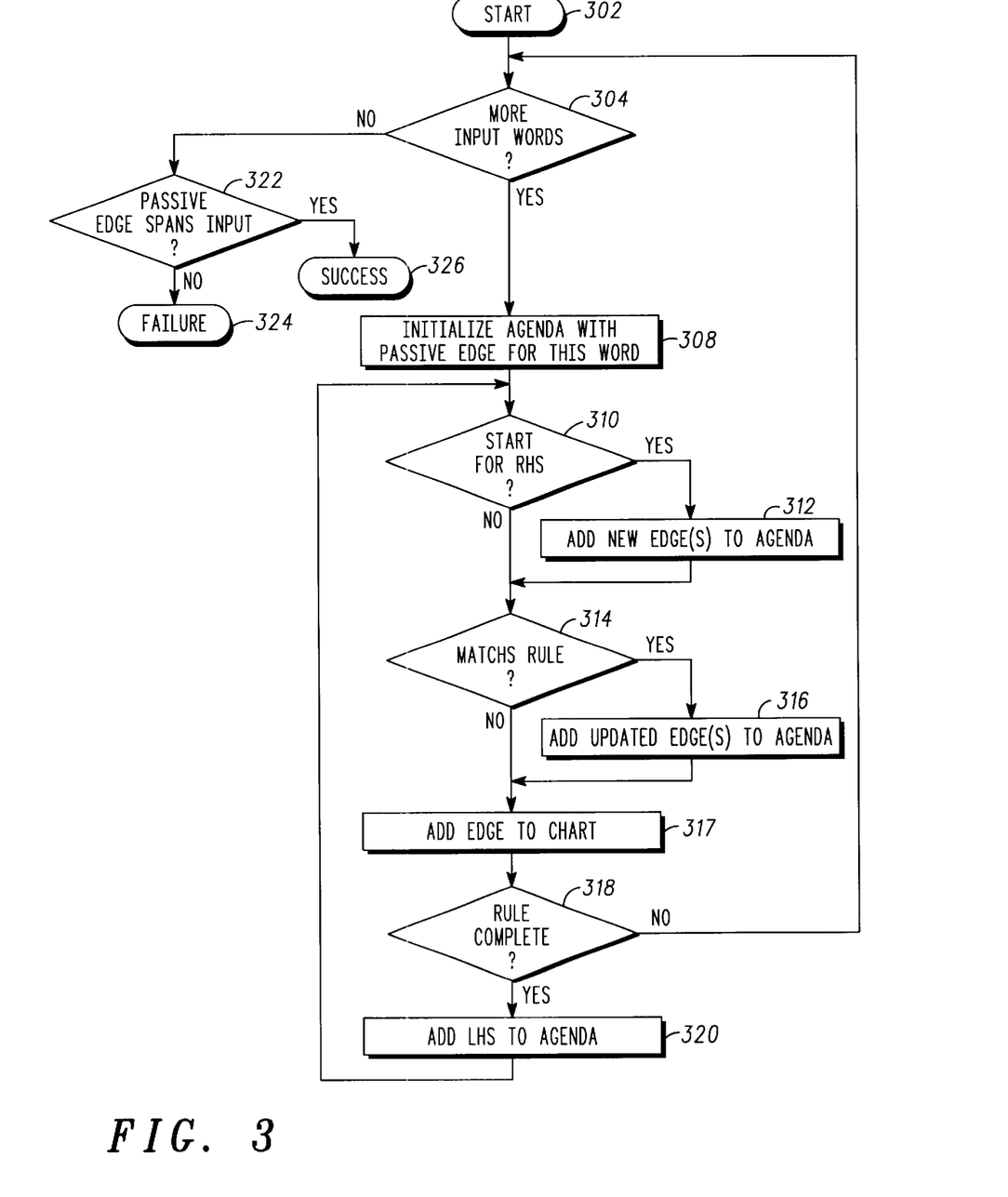
FIG. 3 is a flow chart of one embodiment of the parsing method of the present invention.

FIG. 3 is a flow chart of one embodiment of a parser in accordance with the present invention. Following start block 302, a check is made at decision block 304 to determine is anymore symbols (words) are available from the input sequence. If there are more symbols available, as depicted by the positive branch from decision block 304, a new terminal symbol is read from the input sequence and is replaced with corresponding passive edge at block 308. A passive edge is an edge corresponding to a grammar rule which has been matched completely, i.e., a path has been found from the start to the exit state in the finite state automaton representing its right-hand side. These passive edges, which have yet to be matched to grammar rules are gathered in what is called the 'agenda,' i.e. the agenda comprises those edges that have not been processed yet. At decision block 310, a check is made to determine if any of the nonterminal symbols in the agenda are the starting symbol on the right-hand side of any of the grammar rules. If they are, as depicted by the positive branch from decision block 310, an edge is added to the agenda for each rule that starts with that nonterminal. Once all of the new edges have been added, or, as depicted by the negative branch from decision block 310, there are no new edges to add, a check is made at decision block 314 to see if the nonterminal can be used to predict new edges, by looking at the rules in the grammar. If it can, as depicted by the positive branch from decision block 314, updated or extended edges are added to the agenda at block 316. If no edges can be created this way, as depicted by the negative branch from decision block 314, flow continues to block 317 and the processed edge is moved from the agenda to the chart. At decision block 318, a check is made to determine if any of the edges are complete-that is, if all of the elements on the right-hand side of the rule have been matched. If any edge is complete, as depicted by the positive branch from decision block 318, the nonterminal on the left-hand side of the rule is added to the agenda at block 320, and the completed edge is saved. Flow then returns to decision block 310 to determine if the new nonterminals can be used to start a new edge. If no edge has been completed, as depicted by the negative branch from decision block 318, flow returns to decision block 304 to determine if there are any more input symbols to be processed. If no more symbols are available, as depicted by the negative branch from decision block 304, a decision is made at decision block 322 to determine if a passive edge from the chart spans the complete input sequence. If is does not, as depicted by the negative branch from decision block 322, the process terminates with an indication of failure at block 324. If a passive edge is found to span the complete input sequence, as depicted by the positive branch from decision block 322, the process terminates with an indication of success at block 326. The remaining active and passive edges in the chart are used to interpret the input sequence.

Depth-First (Height-First) Parsing Example

As an example, the input stream "1 6 Lincoln Avenue Apt 3 7 Chicago Ill. 6 0 2 0 1 USA" is considered. The parser begins by reading the first terminal symbol "1" from the input. Using rule 8, this is replaced by the nonterminal <digit> and the edge

[<digit>,0,1,8,0,1,-]

is generated and added to the agenda. This is a complete edge, since the rule only has one element, indicating that a <digit> was found in the input. <digit> appears as the first symbol on the right-hand side of rule 2, so the edge

[<number>,0,1,2,0,1,<<digit>>]

is generated, showing that input between vertices 0 and 1 has been recognized as digit, which is the first symbol of rule 2 and lies between nodes 0 and 1 of the rule. There being no more rules starting with a digit and it not being known if the number is complete, the next input symbol is read. This is the terminal symbol "6" so the edge

[<digit>,0,1,8,0,1,-]

is generated according to rule 8. These two edges can be combined to generate the new edge

[<number>,0,2,2,0,2<<digit>,<digit>>].

The next terminal symbol is "Lincoln Avenue", which is replaced by the edge [<street>,2,3,3,0,1,-]. This does not start a new edge. However, it now determined that the existing <number> edge is complete, indicating that the nonterminal <number> was found in the input. The resulting edge is start of the right-hand side for rule 1, so the new edge

[<address>,0,2,1,0,1,<<number>>]

is generated. This can be combined with the <street> edge to yield

[<address>,0,3,1,0,2,<<number>,<street>>].

The process is continued to give the edge

[<address>,0,4,1,0,3,<<number>,<street>,Apt>].

The next input symbol is the digit "3", which starts a new edge, so the new edge

[<digit>,4,5,8,0,1,-]

is generated. The next input symbol is the digit "7", which updates the new edge, giving

[<number>,4,6,2,0,2,<<digit>,<digit>>]
[<address>,0,6,1,0,3,<<number>,<street>,Apt,<number>>].

The next symbol is the <city> "Chicago", which indicates that the new edge is complete, so the <number> edge is complete and may be combined with the address edge to give

[<city>,6,7,4,0,1,-]
[<address>,0,6,1,0,3,<<number>,<street>,Apt,<number>>]
[<address>,0,7,1,0,4,<<number>,<street>,Apt,<number>,<city>>]

The process continues until all of the input has been recognized. The remaining chart entries (both complete and incomplete) are used to understand the input stream. For example, they may be passed to a semantic interpreter.

Important features of the invention, as illustrated in the above example, are:

(i) the rule does not need to be expanded, (ii) the rule is not copied in the edge (chart entry)—only the position within the finite state automaton representing the rule are stored.

These features result in considerable savings in terms of memory required for the chart and processing time that would otherwise have been required to expand the rules from their abbreviated compact form.

Three operations have been used: new edge generation (when a symbol is found starting the RHS of a rule is found), edge extension (i.e. extending one with another edge according to a rule), and rule completion (when a terminal symbol completing a rule is found).

In the above example, a depth-first or "height first" method has been used, in which the partial input is analyzed as possible before the next input symbol is read. An alternative is to use a "breadth-first" method, in which the entire input is read and the entire input is reduced on level at a time. It is also possible to combine these two methods, by reading in a section of the input rather than the whole input or a single terminal symbol.

Figure 4:
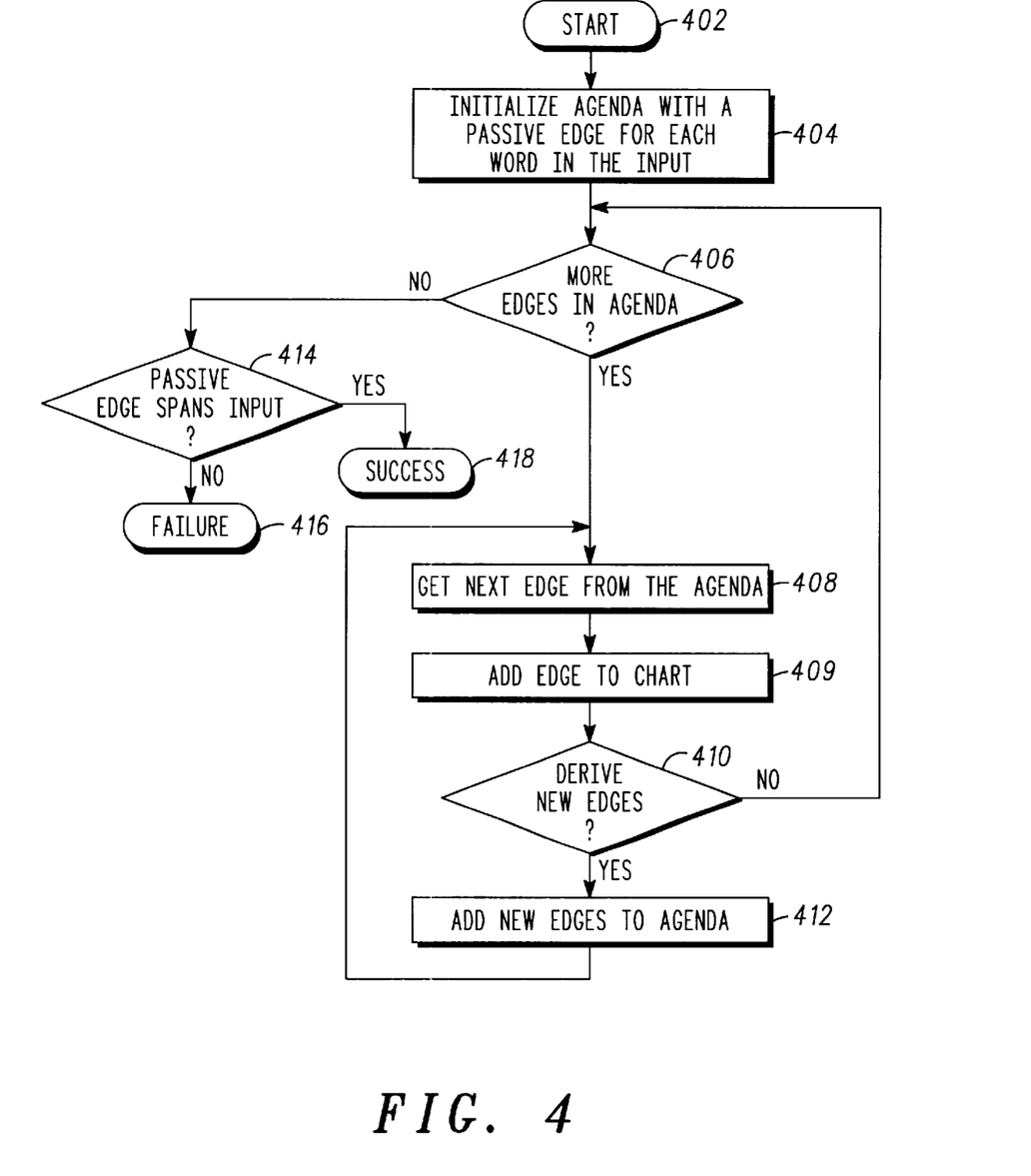
FIG. 4 is a flow chart of a further embodiment of the parsing method of the present invention.

FIG. 4 is a flow chart of a further embodiment of the parsing method of the present invention. This flow chart depicts a "breadth-first" parsing method. The process starts at start block 402. At block 404, the agenda is initialized with a passive edge corresponding to each of the words in the input sequence. At decision block 406 a check is made to determine if there are any edges left in the agenda to process. If there are, as depicted by the positive branch from decision block 406, the next edge is retrieved from the agenda at block 408. At block 409 this edge, which is about to be processed, is added to the chart. At decision block 410 a check is made to determine if a new edge can be derived from the existing edges in the agenda, either by extending or completing an existing edge, starting a new edge. If a new edge can be derived, as indicated by the positive branch from decision block 410, a new edge is added to the agenda at block 412 and flow returns to block 408. If an existing edge is completed (passive), an edge representing the left-hand side of the corresponding rule is added to the agenda. If no new edge can be derived, as indicated by the negative branch from decision block 410. Any completed edges are marked as being passive. Flow then returns to decision block 406. Once all edges in the agenda have been processed, as indicated by the negative branch from decision block 406, a check is made at decision block 414 to determine if any passive (complete) edge in the chart spans the entire input sequence. If none is found, the process terminates at block 416 with an indication of failure. If a passive (complete) edge in the chart is found that spans the entire input sequence, as depicted by the positive branch from decision block 414, the process terminates at block 418 with an indication of success. Variations to the methods described above, with reference to FIG. 3 and FIG. 4, will be apparent to those of ordinary skill in the art, since a number of bottom-up parsing methods are known in the art. Many of these methods may be modified for use with the present invention.

Breadth-First Parsing Example

As an example, the input stream "1 6 Lincoln Avenue Apt 3 7 Chicago Ill. 6 0 2 0 1 USA" is again considered.

Initialization:

Each word in the input sequence is first associated with a passive edge, so the following 14 edges are added to the agenda:

1. [1,0,1,-,-] (1 is found between pos. 0 and 1 in the input utterance)
2. [6,1,2,-,-] (6 is found between pos. 1 and 2 in the input utterance)

. . .

14. [USA,13,14,-,-] (USA is found between pos. 13 and 14 in the input utterance)

After initialization, the two operations RuleCompletion and EdgeCompletiontoRight are used to derive new edges. ?

The edges in the agenda are used to complete rule from the grammar

15. [<digit>,0,1,8,0,1]
    (rule 8 has been applied to rewrite 1 to <digit>, this corresponds to the part of the input utterance between positions 0 and 1, the part of rule 8 that has been matched is between states 0 and 1 which are also the start and exit states respectively which means that this is a complete edge.
16. [<digit>,1,2,8,0,1]]
    (rule 8 has been applied to rewrite 6 to <digit>, this corresponds to the part of the input utterance between positions 1 and 2, the part of rule 8 that has been matched is between states 0 and 1 which are also the start and exit states respectively which means that this is a complete edge.
17. [<number>,0,1,2,0,11]
    (edge 15 is matched against the first arc in rule 2, this is not a complete edge because state 1 is not an exit state.)
18. [<digit>,4,5,8,0,1]]
    (rule 8 has been applied to rewrite 3 to <digit>, this corresponds to the part of the input utterance between positions 4 and 5, the part of rule 8 that has been matched is between states 0 and 1 which are also the start and exit states respectively which means that this is a complete edge.
19. [<digit>,5,6,8,0,1]]
    (rule 8 has been applied to rewrite 3 to <digit>, this corresponds to the part of the input utterance between positions 5 and 6, the part of rule 8 that has been matched is between states 0 and 1 which are also the start and exit states respectively which means that this is a complete edge.
20. [<number>,4,5,2,0,1]
    (edge 18 is matched against the first arc in rule 2, this is not a complete edge because state 1 is not an exit state.)

etc.

EdgeCompletiontoRight

21. [<number>,0,2,2,0,2]
    (edge 17 is combined with edge 16 to derive a complete edge representing that the nonterminal <number> was found in the input utterance between the positions 0 and 2.)
22. [<number>,4,6,2,0,2]
    (edge 20 is combined with edge 19 to derive a complete edge representing that the nonterminal <number> was found in the input utterance between the positions 4 and 6.)
23 [<zip_code>,8,13,6,0,5]]
    (previous edges are combined to derive a complete edge representing that the nonterminal <zip_code> was found in the input utterance between the positions 8 and 13.)

etc.

The complete input utterance has been recognized as soon as the following edge is derived:

n. [<address>,0,14,1,0,8]
    (rule 1 has been applied form start to exit, i.e., 0 and 8 respectively, over the complete input utterance, i.e., from position 0 to 14.)

Figure 5:
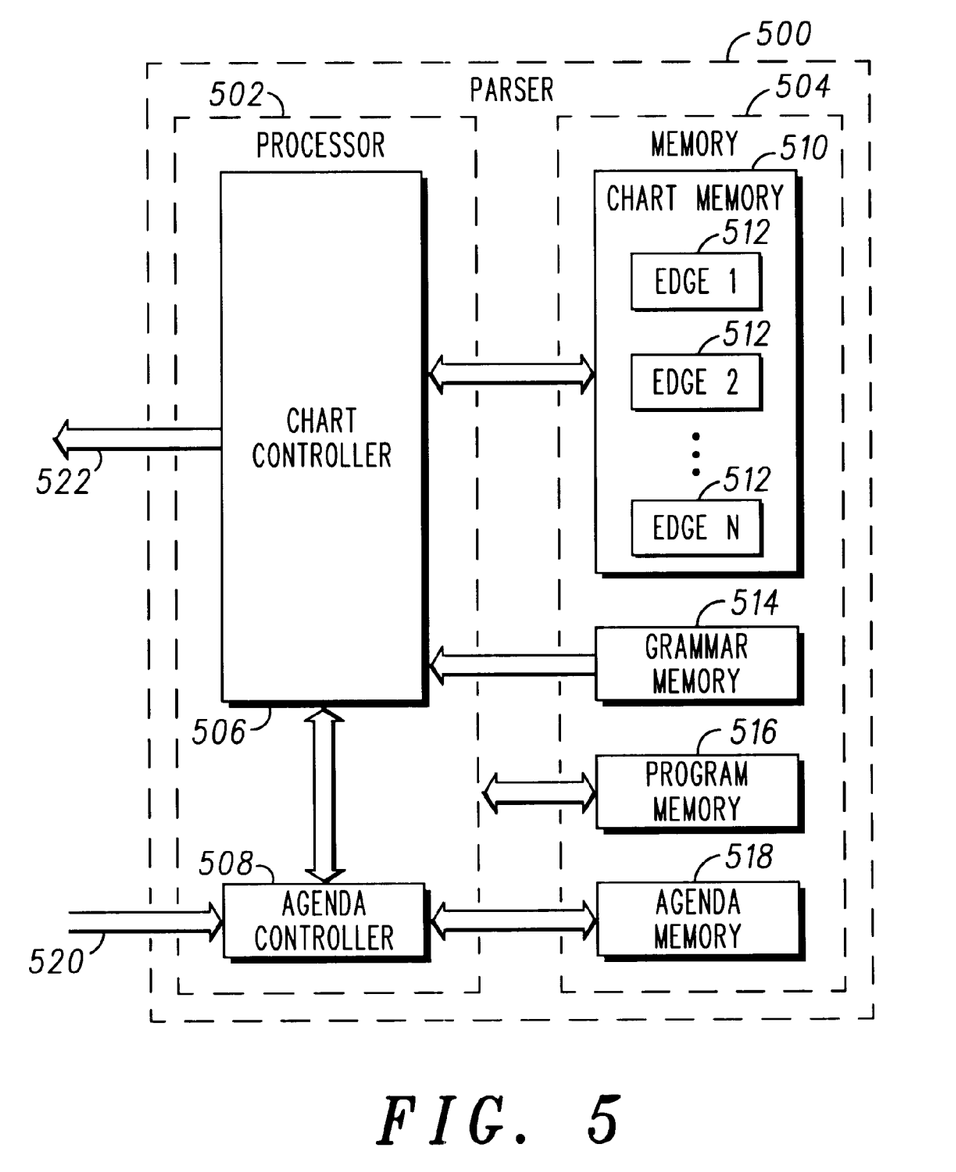
FIG. 5 is diagrammatic representation of a parser in accordance with one embodiment of the present invention.

FIG. 5 is diagrammatic representation of a parser 500 in accordance with one embodiment of the present invention. The parse comprises a processor 502 and a memory unit 504. The processor 502 includes a chart controller 506 and an agenda controller 508. The memory unit includes a chart memory 510 for storing chart entries or edges 512, a grammar memory 514 for storing the abbreviated rules of the grammar, a program memory 516 for storing processor instruction and an agenda memory 518 for storing edges to be processed. The agenda controller operates to receive an input sequence 520 of words or symbols. This input may be received from a speech recognition system for example. The symbols are processed by the agenda controller 508 and the results stored in the agenda memory 516. The chart controller 506 operates on the agenda items (accessed through the agenda controller 508 as shown, or accessed directly from the agenda memory 518) according to the abbreviated grammar rules stored in grammar memory 514. The agenda items and the rules are used to update the entries or edges 512 in the chart memory 510. The final contents of the chart memory are output through the chart controller 506 to output 520. The chart entries may be passed to a semantic interpreter for further processing.

The current invention deals successfully with null transitions. For every edge added to the agenda it is determined whether there exist related edges that can be derived as a result of using the null transitions in the finite state automaton representing the right-hand side of the associated rule. If related edges can be derived these are added to the agenda just like any other edge.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. For instance, the present invention supports bidirecitonal bottom-up parsing meaning that the right-hand side of a grammar rule can be processed from left-to-right and from right-to-left. Thus the left and right remainders needed for bi-directional parsing are both tracked.

What is claimed is:

1. A method for generating a parse chart for a sequence of input symbols in accordance with an abbreviated representation of a grammar comprising a set of rules formed using operaters for optionality, disjunctivity, and repetition, said method comprising:

storing the abbreviated representation of the grammar as a set of finite-state automata, each finite-state automaton of the set of finite-state automata corresponding to a rule of the set of rules;

receiving the sequence of input symbols;

deriving chart edges from the sequence of input symbols in accordance with said abbreviated representation of the grammar each such chart edge identified by one automaton of said set of finite-state automata; and storing said chart edges in the parse chart.

2. A method in accordance with claim 1, wherein said sequence of input symbols is indexed by a plurality of input vertex indices.

3. A method in accordance with claim 1, wherein said abbreviated representation of a grammar is a Extended Backus-Naur Form (EBNF).

4. A method in accordance with claim 1, further comprising:

initializing an agenda of items with a passive chart edge for each symbol of the sequence of input symbols;

for each item of said agenda of items, comprising:

if any new chart edges can be derived from said item in accordance with said abbreviated representation of the grammar:

deriving said new chart edges; and adding the new chart edges to the agenda of items;

storing said item in said parse chart.

5. A method in accordance with claim 1, further comprising indicating failure if the parse chart contains no passive edge that spans the sequence of input symbols; and indicating success if the parse chart contains a passive edge that spans the sequence of input symbols.

6. A method in accordance with claim 1, wherein each rule of the set of rules has a left-hand side and a right-hand side, further comprising:

initializing an agenda of items with a passive edge for the first symbol of the sequence of input symbols;

until no more symbols in the sequence of input symbols, repeating the process of:

if the agenda of items is empty, adding a passive edge for the next symbol of the sequence of input symbols;

retrieving an item from said agenda of items;

deriving one or more new edges from said item in accordance with said abbreviated representation of the grammar and a plurality of edges stored in said parse chart;

storing said one or more new edges in said agenda of items; and storing the item in said parse chart.

7. A method for generating a parse chart for a sequence of input symbols in accordance with an abbreviated representation of a grammar, said method comprising:

storing the abbreviated representation of the grammar as a plurality of finite-state automata, each finite-state automaton of the plurality of finite-state automata corresponding to a rule of the grammar;

receiving the sequence of input symbols;

deriving chart edges from the sequence of input symbols in accordance with said abbreviated representation of the grammar in accordance with said plurality of finite-state automata; and storing said chart edges in the parse chart wherein each chart edge spans a portion of the sequence of input symbols and wherein each rule of the grammar has a left-hand side and a right-hand side, each said chart edge comprising:

a left input vertex index corresponding to a start of a span of the chart edge;

a right input vertex index corresponding to an end of the span of the chart edge;

a rule number, indicating a finite-state automaton of the plurality of finite-state automata that has been matched to generate the chart edge;

a left state index, indicating the left-most state of the finite-state automaton that has been matched; and a right state index, indicating the right-most state of the finite-state automaton that has been matched.

8. A method in accordance with claim 7, wherein said chart edge further comprises a left-hand side of a rule from the grammar.

9. A method in accordance with claim 8, wherein said chart edge further comprises a path entry representative of a path through the finite-state automaton that has been matched.

10. A method in accordance with claim 8, wherein said chart edge further comprises a list of pointers to the chart edges from which said chart edge was derived.

11. A chart parser, comprising:

an input for receiving input symbols;

a chart memory for storing chart edges;

a grammar memory for storing a set of finite state automata that have a one-to-one correspondence with a set of abbreviated grammar rules formed using operators for optionality, disjunctivity, and repetition;

an agenda memory for storing agenda items;

a program memory for storing a program of processor instructions;

a processor, operably coupled to said program memory, said processor comprising:

an agenda controller, operably coupled to said agenda memory and to said input; and a chart controller, operably coupled to said chart memory and said grammar memory; and an output coupled to said chart memory via said chart controller, wherein said chart controller is operable to update the chart memory directly using one rule of the set of abbreviated grammar rules for each edge.

12. A chart parser in accordance with claim 11, wherein said input is operable to be coupled to an automatic speech recognizer and said input symbols correspond to words in a natural language utterance.

13. A chart parser in accordance with claim 11, wherein processor further comprises an automatic speech recognizer and said input symbols correspond to words in a natural language utterance.

14. A chart parser in accordance with claim 11, wherein said output is operable to be coupled to a semantic interpreter.

15. A chart parser in accordance with claim 11, wherein said processor further comprises a semantic interpreter operably coupled to said chart memory.

* * * * *